United States Patent [19]
Mizrahi

[11] Patent Number: 6,069,719
[45] Date of Patent: May 30, 2000

[54] DYNAMICALLY RECONFIGURABLE OPTICAL ADD-DROP MULTIPLEXERS FOR WDM OPTICAL COMMUNICATION SYSTEMS

[75] Inventor: Victor Mizrahi, Columbia, Md.

[73] Assignee: Ciena Corporation, Linthicum, Md.

[21] Appl. No.: 08/902,810

[22] Filed: Jul. 30, 1997

[51] Int. Cl.[7] .................................................. H04J 14/02
[52] U.S. Cl. ......................... 359/124; 359/127; 359/128; 359/130
[58] Field of Search ..................................... 359/124, 127, 359/128, 129, 130, 131; 385/37

[56] References Cited

U.S. PATENT DOCUMENTS

| | | | |
|---|---|---|---|
| 5,612,805 | 3/1997 | Fevrier et al. | 359/128 |
| 5,712,932 | 1/1998 | Alexander et al. | 359/127 |
| 5,715,076 | 2/1998 | Alexander et al. | 359/130 |
| 5,748,815 | 5/1998 | Hamel et al. | 359/130 |
| 5,760,934 | 6/1998 | Sutter et al. | 359/127 |
| 5,778,118 | 7/1998 | Sridhar | 359/130 |

OTHER PUBLICATIONS

Toba, H., et al.; "An Optical FDM–Based Self–Healing Ring Network Employing Arrayed WaveGuide Grating Filters and EDFA's with Level Equalizers"; pp. 800–813; IEEE Journal on Selected Areas in Communications, vol. 14, No. 5, Jun. 1996.

Toba, H., et al.; "Demonstration of Optical FDM Based Self–Healing Ring Network Employing Arrayed–WaveGuide–Gratting ADM Filters and EFDAS"; pp. 263–266; Optical Communication (EC, Firenze, Sep. 25–29, 1994) vol. 1, No. CONF. 20, Sep. 1994.

Kitayama, K. –I; "Subarrier Multiplexing Based Signaling and Access Control in Optical FDM Networks"; pp. 1996–2002; Telecommunications Conference, Singapore, Nov. 14–16, 1995, vol. 3, Nov. 1995.

Tachikawa, Y., et al.; "Arrayed–WavGuide Grating Multiplexer with Loop–Back Optical Paths and its Applications"; pp. 977–984; Journal of Lightwave Technology, vol. 14, No. 6, Jun. 1996.

Beer, J.; "Photonische Transportnetze"; pp. 20–24; Technische Rundschau Transfer, vol. 88, No. 14, Apr. 1996.

Chawki, M. J., et al.; "Evaluation of an Optical Boosted Add/Drop Multiplexer OBADM Including Circulators and Riber Grating Filters"; pp. 47–50; Proceedings of the European Conference on Optical Communication, vol. 1, Sep. 1995.

Notification of Transmittal of The International Search Report or The Declaration, 6 pages.

*Primary Examiner*—Daniel J. Wu
*Assistant Examiner*—John Tweel, Jr.
*Attorney, Agent, or Firm*—David L. Soltz; Margaret Burke

[57] ABSTRACT

In an optical add/drop multiplexer, an optical switch is coupled to one or more outputs from a demultiplexer. Accordingly, a dropped optical channel can be switched between a receiver optical path for directing the dropped optical signal to an optical receiver and between a combiner optical path for routing the dropped optical channel back towards the optical transmission path, optionally passing the dropped optical channel through a remodulator. Alternatively, the optical switch routes the dropped optical channel towards an optical receiver while permitting a new optical channel to be routed to add port of the static add-drop multiplexer.

10 Claims, 5 Drawing Sheets

DYNAMICALLY RECONFIGURABLE OPTICAL ADD-DROP MULTIPLEXERS FOR WDM OPTICAL COMMUNICATION SYSTEMS

FIELD OF THE INVENTION

The invention relates to optical add-drop multiplexers and, more particularly, to optical add-drop multiplexers for wavelength division multiplexed optical communication systems which are dynamically reconfigurable for transferring selected optical channels between optical paths within the optical system.

BACKGROUND OF THE INVENTION

Wavelength division multiplexing (WDM) is one technique used to increase the capacity of optical communication systems. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, NY) c. 1993, the disclosure of which is incorporated herein by reference. A wavelength division multiplexed optical communication system employs plural optical channels, each channel being assigned a particular channel wavelength. In a WDM system, optical channels are generated, multiplexed to form an optical signal comprised of the individual optical channels, transmitted over a waveguide, and demultiplexed such that each channel wavelength is individually routed to a designated receiver. Through the use of optical amplifiers, such as doped fiber amplifiers, plural optical channels are directly amplified simultaneously, facilitating the use of wavelength division multiplexing in long-distance optical systems.

In many applications, such as optical LANs, cable television subscriber systems, and telecommunications networks, there is a need to route one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities. Additionally, optical routing must be sufficiently flexible to enable a variety of system configurations, permitting optical signal paths to be reconfigured in response to changing traffic pattern requirements. Thus, there is a need in the art for flexible and effective optical routing to enable practical implementation of wavelength division multiplexed optical communication systems.

SUMMARY OF THE INVENTION

The present invention provides a reconfigurable optical add-drop multiplexer for a wavelength division multiplexed optical communication system. The reconfigurable add-drop multiplexer includes a static optical add-drop multiplexer including an input port for receiving optical signals from an optical transmission path in a wavelength division multiplexed optical communication system, a drop port for routing optical channels to be removed from an optical transmission path, an add port for receiving optical channels to be added to an optical transmission path, and wavelength selecting means for selecting at least one optical channel to be dropped from the optical transmission path.

An optical path communicating with the drop port includes an optical demultiplexer having an input port for receiving the dropped optical channels and plural demultiplexer output ports for separately outputting optical channels. Alternatively, the demultiplexer can be omitted if only one optical channel is to be dropped. Plural demultiplexer optical paths optically communicate with the optical demultiplexer for receiving each of the dropped optical channels. Similarly, an optical path optically communicates with the add port of the static add-drop multiplexer. The add optical path includes an optical combiner or multiplexer having plural combiner input ports communicating with plural combiner optical paths for receiving optical channels to be added to the optical transmission path and an output port for outputting a combined optical signal comprising the optical channels received from the combiner input ports.

An optical switch positioned in one or more of the demultiplexer optical paths permits switching of a dropped optical channel between a receiver optical path for directing the dropped optical signal to an optical receiver and between a combiner optical path for routing the dropped optical channel back towards the optical transmission path, optionally passing the dropped optical channel through a remodulator. Alternatively, the optical switch routes the dropped optical channel towards an optical receiver while permitting a new optical channel to be routed to add port of the static add-drop multiplexer.

DETAILED DESCRIPTION

Figure 1:
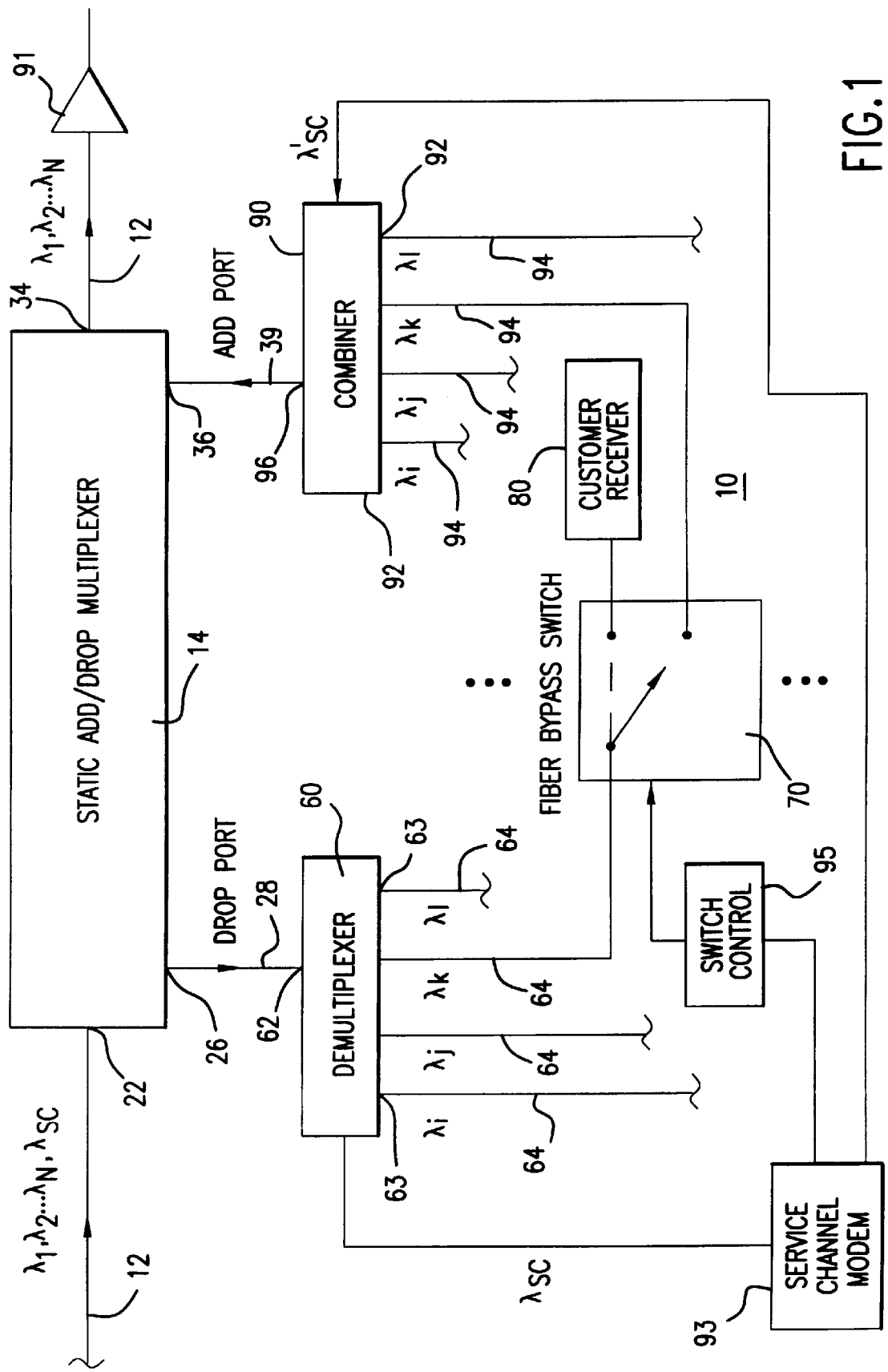
FIG. 1 schematically depicts a reconfigurable add-drop multiplexer according to the present invention.

Turning now to the drawings in detail, in which like numerals indicate the same or similar elements, FIG. 1 depicts a reconfigurable add-drop multiplexer 10 according to the present invention. Reconfigurable add-drop multiplexer 10 is interposed in optical transmission path 12. Transmission path 12 is typically a single mode optical fiber that forms the principal transmission medium of an N-channel wavelength division multiplexed optical system where N is a whole number greater than or equal to 2. Exemplary values for N are 4, 8, 16, and 32 or more optical channels. WDM optical systems suitable for the application of the present invention are described in commonly-assigned U.S. Pat. No. 5,504,609, the disclosure of which is incorporated by reference herein.

Figure 2:
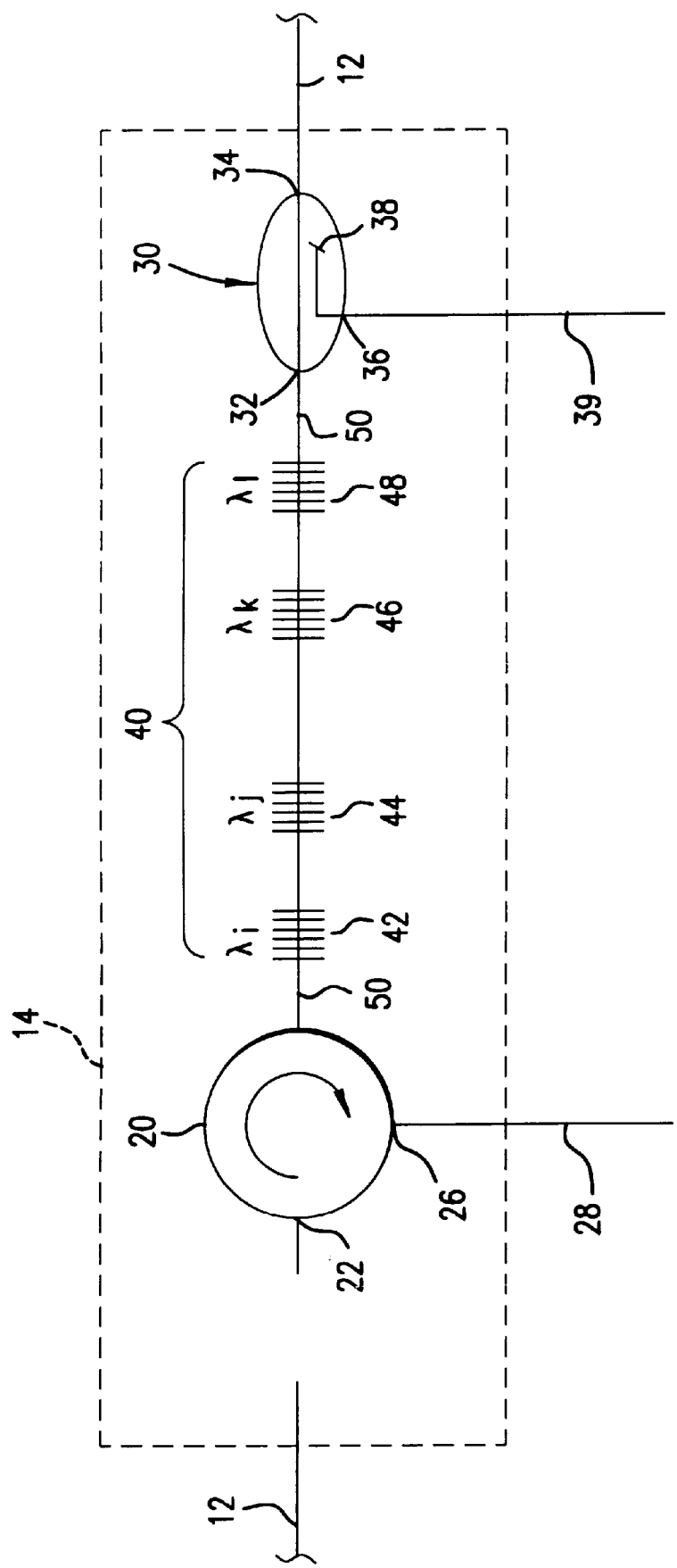
FIG. 2 schematically depicts a static add-drop multiplexer for use with the reconfigurable add-drop multiplexer of FIG. 1.

Reconfigurable add-drop multiplexer 10 includes static add-drop multiplexer 14 for removing and inserting optical channels into optical transmission path 12. The expression "static" as used to describe add-drop multiplexer 14 refers to the fact that the channels dropped by multiplexer 14 are fixed, and are not remotely reconfigurable. An exemplary add-drop multiplexer for use as static add-drop multiplexer 14 is depicted in FIG. 2. Add-drop multiplexer 14 comprises an optical circulator 20 having first, second, and third optical circulator ports 22, 24, and 26, respectively. Optical circulator 20 is configured such that optical signals which enter circulator port 22 exit through circulator port 24 and optical signals which enter circulator port 24 exit through circulator port 26.

Optical transmission path 12 optically communicates with first circulator port 22. The expression "optically communicates" as used herein, refers to any connection, coupling, link, or the like, by which optical signals carried by one optical system element are imparted to the "communicating" element. Such "optically communicating" devices are not necessarily directly connected to one another, but may be separated by intermediate optical components or devices. In an exemplary embodiment, optical transmission path 12 is a single mode optical fiber which forms the principal transmission medium for a wavelength division multiplexed optical communication system.

A second transmission path 50 optically communicates with second circulator port 24. Positioned within optical transmission path 50 is an optical filter 40. In the depicted embodiment, filter 40 comprises a set of four fiber Bragg gratings, 42, 44, 46, and 48 respectively corresponding to wavelengths of $\lambda_i$, $\lambda_j$, $\lambda_k$, and $\lambda_l$. In an exemplary embodiment, $\lambda_i < \lambda_j < \lambda_k < \lambda_l$ to avoid problems associated with transmission through radiation mode loss regions of adjacent gratings. Although gratings are employed as an exemplary optical filter, it is understood that any optical device capable of selecting the desired optical channels can be employed as filter 40.

A third optical transmission path 28 optically communicates with third optical circulator port 26. Optical transmission path 28 receives optical signals which are reflected by optical filter 40 back towards second circulator port 24.

Optical coupler 30 is used to couple optical signals to be added to an optical transmission system. Optical coupler 30 is selected from any optical device which combines optical signals from plural input ports and places the combined optical signal onto an output port. Typically, the optical signals from two input ports are equally combined and placed on the output path although the two input paths can be combined in various ratios (e.g., 70:30, 80:20, etc.) depending upon the needs of the optical system (e.g., when desiring to equalize signal strength from two optical paths). Exemplary optical couplers are 1X2 fused fiber optical splitters, commercially available from Corning and Gould, used to combine signals rather than split the signals. Optical coupler 30 includes first input port 32, second input port 36, and output port 34. First input port 32 optically communicates with optical transmission path 50 for receiving those optical signals output by optical circulator port 24 which are not dropped by optical filter 40, i.e., the "through" optical signals.

A fourth optical transmission path 39 optically communicates with second coupler input port 36 for adding optical signals to the through optical signals received by first coupler input port 32. Because coupler 30 combines the optical signals from input ports 32 and 36, the optical signals which are added via transmission path 39 do not contact optical filter 40 but are directly combined with the signals from first input port 32 and output through port 34. Consequently, an arbitrary number of optical channels may be added to the optical system; the wavelengths of the optical channels do not need to correspond to the wavelengths of the channels dropped by optical filter 40.

Optical transmission path 12, i.e., the primary optical transmission path of the WDM optical system, optically communicates with coupler output port 34 for receiving the combined optical signal from the first and second input ports. It is emphasized that the static add-drop multiplexer of FIG. 2 is merely exemplary. Any add-drop multiplexer which can select the desired optical channels can be used in the reconfigurable add-drop multiplexers of the present invention. For example, an add drop multiplexer based on interference filters commercially available from Dicon and JDS Fitel, for example, may also be used. Further exemplary add-drop multiplexers are described in commonly-assigned U.S. patent application Ser. No. 08/622,957, filed Mar. 27, 1996 and 08/759,965, filed Dec. 2, 1996, the disclosures of which are incorporated by reference herein.

Returning to the reconfigurable add-drop multiplexer of FIG. 1, optical path 28, which receives the dropped optical channels, optically communicates with demultiplexer input port 62 of optical demultiplexer 60 for separating the dropped optical channels into individual optical channels to be individually routed to separate output paths 64 through output ports 63. Optical demultiplexer can be selected from any optical device or system which can take a combined optical signal and separate individual optical channels therefrom. Exemplary optical demultiplexers include planar waveguide devices such as arrayed waveguide gratings (AWG) or other routers, as well as passive optical splitters combined with gratings-based selectors (see, for example, the receiving system grating selectors of U.S. Pat. No. 5,504,609, incorporated herein by reference).

Typically, the dropped optical channel will be routed to optical receiver 80, either directly or after being transmitted through another branch of the same or another optical system. However, if it is desired that the optical channel remain on the optical transmission path 12, the optical channel can be routed to an optical path leading to the add port of static add-drop multiplexer 14. Optical switch 70 permits the selection of either optical path for the appropriate routing of the dropped optical signal. Optical switch 70 may be an SR12AU-20NC 1:2 optical switch commercially available from JDS-Fitel. However, it is understood that the depicted optical switches are exemplary. Other electromechanical optical switches as well as electro-optic and thermo-optic switches having a variety of switching configurations can also be employed in the reconfigurable add-drop multiplexers of the present invention. Exemplary optical switches and switch configurations enable the selection of different optical path in fewer than 50 milliseconds, with times of fewer than 15 milliseconds or even less than 1 millisecond being preferred.

To optionally enable the reconfigurable add-drop multiplexers of the present invention to be dynamically reconfigurable, the optical switches can be externally controlled through control signals carried by a service channel, $\lambda_{SC}$, on optical transmission path 12, as shown in FIG. 1. The service channel is fed, via optical demultiplexer 60, to a circuit such as a service channel modem 93 where it is converted to an electrical signal used to direct switch controller circuit 95. If the service channel carries information for receipt by other service channel modems coupled to optical communication path 12, service channel modem 93 retransmits the service channel, $\lambda_{SC}'$, to optical communication path 12 via combiner 90. While this technique for controlling the optical switching is exemplary, it is understood that any method for controlling the optical switches is within the scope of the present invention.

Optical channels to be added to optical transmission path 12 enter static add-drop multiplexer 14 through input port 36. Input port 36 optically communicates with add optical path 39 in which is positioned optical combiner 90. Optical combiner 90, including, for example, a passive optical element such as a fused fiber coupler, or a multiplexer which routes wavelengths, receives optical channels to be added to the wavelength division multiplexed optic system through combiner input ports 92. Combiner input ports 92 communicate with combiner optical paths 94 which carry the optical channel(s) to be added. In the configuration of FIG. 1, the optical channel to be added is the same as the optical channel dropped by the static add-drop multiplexer. Other optical paths 94 can communicate with optical transmitters, remodulators, or other dropped optical channels for carrying optical channels to be added to the optical system. The depicted optical switch can be interposed in any or all of the remaining "drop" optical paths. The optical channels to be added can have any optical channel wavelength as long as that wavelength is not occupied by a "through" channel passed by static add-drop multiplexer 14. Moreover, the channels to be added and dropped can be changed or reconfigured without affecting the through channels.

Figure 3:
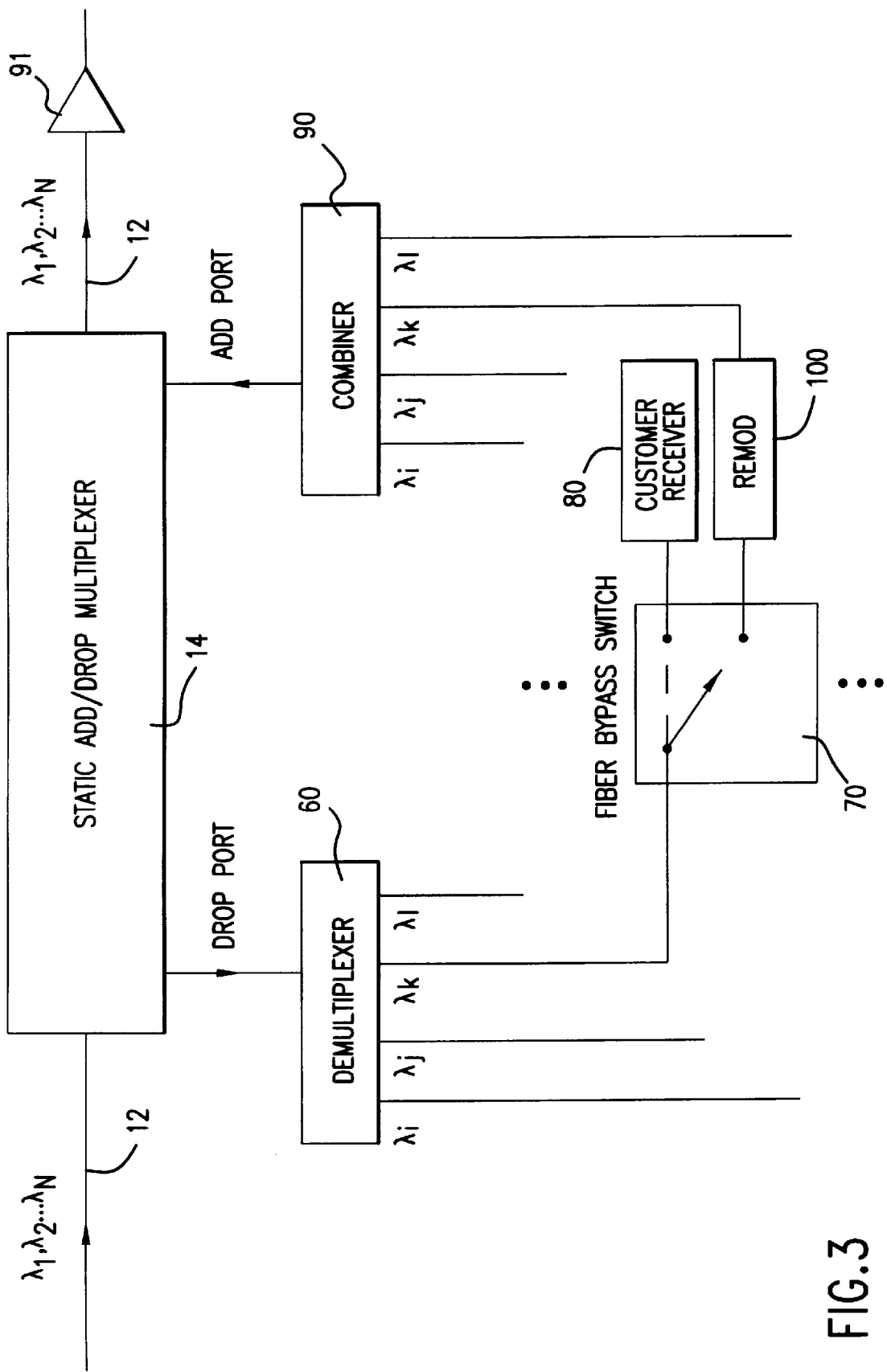
FIG. 3 schematically depicts a reconfigurable add-drop multiplexer according to a further embodiment of the present invention.
Figure 5:
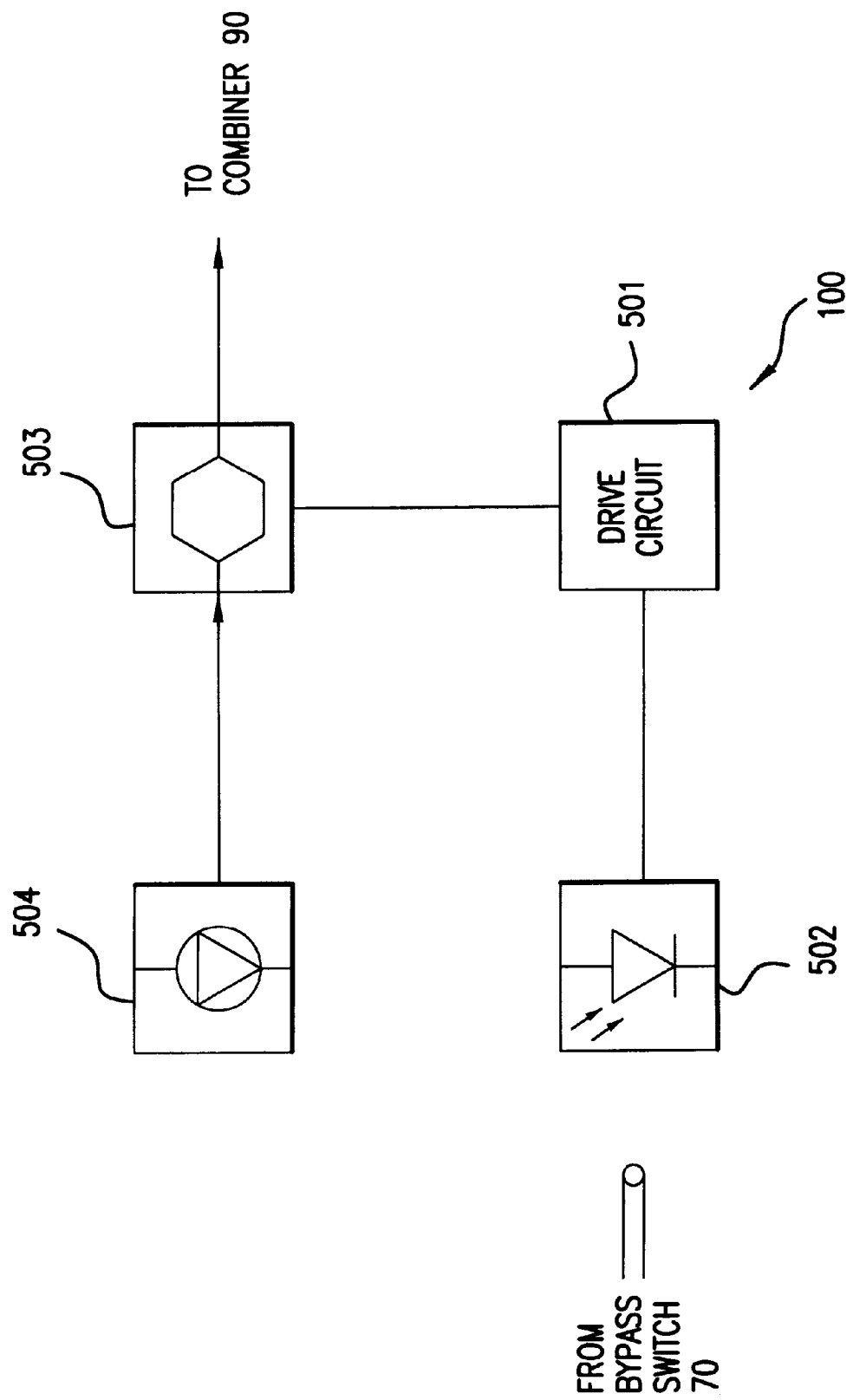
FIG. 5 schematically depicts a remodulator.

In the configuration of FIG. 3, a dropped optical channel to be added back into the optical system is first routed through an optical remodulator 100. As seen in FIG. 5, optical remodulator 100 includes an optoelectronic element, such as photodetector 502, for receiving a dropped optical channel and outputting a corresponding electrical signal which includes the information from the optical channel. The electrical signal is supplied to a drive circuit 501, which, in turn, supplies a modulating circuit to external modulator 503. An optical source, such as semiconductor laser 504, continuously emits light which is modulated by external modulator 503, a Mach-Zehnder interferometer, for example, in accordance with the electrical signal. The modulated light is next output to combiner 90.

Exemplary remodulators for use with the present invention are described in U.S. Pat. No. 5,504,609, incorporated by reference above. The configuration shown in FIG. 3 advantageously regenerates the signal and readily accomplishes wavelength translation.

Although an external modulation scheme is illustrated in FIG. 5, a directly modulated scheme is within the scope of the present invention whereby a modulated optical output is generated by directly turning laser 504 on and off.

Preferably, the power level of the optical signal is adjusted so that all the channels carried by optical transmission path 12 have substantially the same power level, i.e., "power balancing" is achieved. Moreover, in the embodiments illustrated in FIGS. 1 and 3, an optical amplifier 91, including an erbium doped fiber, for example, can be provided at the output of static add/drop multiplexer 14 to amplify signals carried on optical transmission path 12. Alternatively, optical amplifier 91 can be provided at the input of add/drop multiplexer 14.

Figure 4:
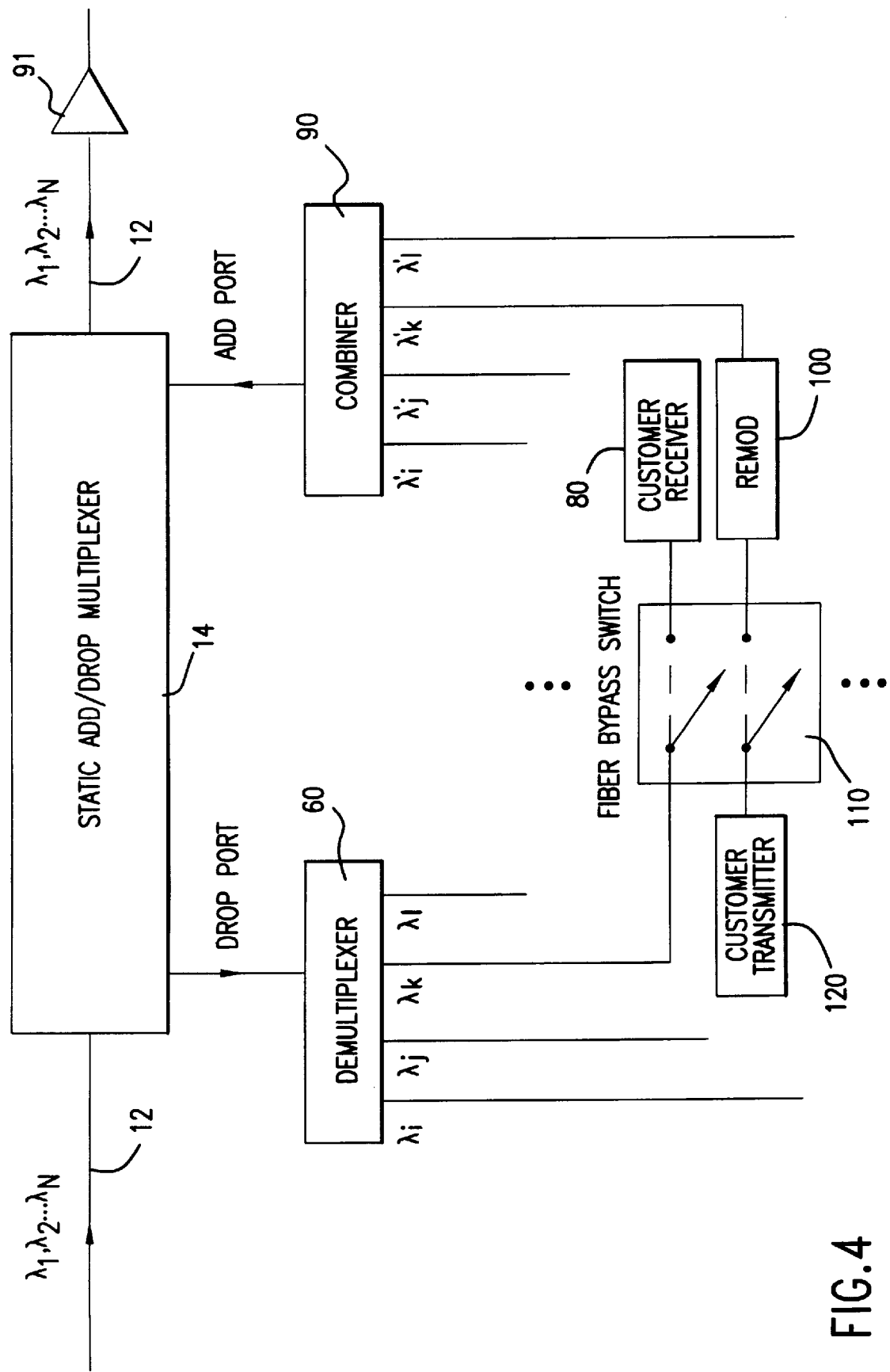
FIG. 4 schematically depicts a reconfigurable add-drop multiplexer according to a further embodiment of the present invention.

In the configuration of FIG. 4, a 2:2 bypass optical switch 110, for example, an SR2BA5-20NC commercially available from JDS-Fitel, permits the dropped optical channel to be routed to optical receiver 80. An optical channel to be added is generated by optical transmitter 120 and mapped to a channel wavelength within the channel plan of the WDM optical system through remodulator 100. In this embodiment, a dropped channel to be re-routed to the optical transmission path is passed through the remodulator, as in the previous embodiment.

While the foregoing invention has been described in terms of the embodiments discussed above, numerous variations are possible, Accordingly, modifications and changes such as those suggested above, but not limited thereto, are considered to be within the scope of following claims.

What is claimed is:

1. A reconfigurable optical add-drop multiplexer for a wavelength division multiplexed optical communication system comprising:

a static optical add-drop multiplexer including an input port for receiving optical signals from an optical transmission path in a wavelength division multiplexed optical communication system, a drop port for routing optical channels to be removed from an optical transmission path, an add port for receiving optical channels to be added to an optical transmission path, wavelength selecting means for selecting optical channels to be dropped from the optical transmission path, an output port supplying at least ones of said optical channels not selected by said selecting means, and a continuous optical path coupling said input port and said output port;

an optical path optically communicating with the drop port having positioned therein an optical demultiplexer having a demultiplexer input port for receiving the dropped optical channels and plural demultiplexer output ports for separately outputting optical channels;

plural demultiplexer optical paths optically communicating with the optical demultiplexer for receiving each of the dropped optical channels;

an optical path optically communicating with the add port having positioned therein an optical combiner having plural combiner input ports for receiving optical channels to be added to the optical transmission path and an output port for outputting a combined optical signal comprising the optical channels received from the combiner input ports;

at least one optical receiving path configured to route a dropped optical channel to an optical receiver;

plural combiner optical paths optically communicating with the optical combiner for carrying optical channels to be added to the optical transmission path;

optical switching means optically communicating with a demultiplexer optical path and with a combiner optical path and with an optical receiving means, the optical switching means configured to switch a dropped optical channel from the demultiplexer optical path to the combiner optical path or to switch a dropped optical channel from the demultiplexer optical path to the optical receiving means.

2. A reconfigurable optical add-drop multiplexer as recited in claim 1 further comprising an optical remodulator positioned in the combiner optical path optically communicating with the optical switching means, the optical remodulator comprising:

an optoelectronic element for receiving a dropped optical channel and outputting a corresponding electrical signal which includes the information from the optical channel;

an optical source for emitting an optical signal at an optical channel wavelength; and means for modulating the optical source with information from the electrical signal output by the optoelectronic element to create an output signal including the information from the dropped optical channel;

a remodulator output port optically communicating with the combiner optical path for placing the output signal onto the combiner optical path.

3. A reconfigurable optical add-drop multiplexer in accordance with claim 2, wherein a wavelength of said dropped optical channel is different than a wavelength of said output signal.

4. A reconfigurable optical add-drop multiplexer as recited in claim 2 further comprising an optical transmitter for transmitting an optical signal to be supplied to the optical remodulator.

5. A reconfigurable optical add-drop multiplexer, comprising:

a static add/drop multiplexer having an input port receiving a first plurality of wavelength division multiplexed channels, a drop port, an add port, an output port outputting a second plurality of wavelength division multiplexed channels, a continuous optical path coupling said input port to said output port, said static add/drop multiplexer outputting at least one of said first plurality of wavelength division multiplexed channels through said drop port; and an optical switch coupled to said drop port, said switch selectively supplying said at least one of said first plurality of wavelength division multiplexed channels to one of an opto-electronic receiver and said add port, said at least one of said plurality of wavelength division multiplexed channels being supplied through said output port of said static add/drop multiplexer as one of said second plurality of wavelength division multiplexed channels when said optical switch supplies said at least one of said first plurality of wavelength division multiplexed channels to said add port.

6. A reconfigurable optical add-drop multiplexer in accordance with claim 4, wherein said input port also receives a service channel carrying control signals, said service channel being output through said drop port, said reconfigurable optical add-drop multiplexer further comprising:

a service channel modem circuit coupled to said drop port, said service channel modem generating an electrical control signal in response to said service channel; and a switch controller circuit coupled to said optical switch and configured to receive said electrical control signal, said switch controller circuit controlling said optical switch in accordance with said electrical control signal.

7. An optical device comprising:

a static add/drop multiplexer having an input port receiving a first plurality of wavelength division multiplexed channels, a drop port, an add port, an output port outputting a second plurality of wavelength division multiplexed channels, a continuous optical path coupling said input port to said output port, said static add/drop multiplexer outputting at least one of said first plurality of wavelength division multiplexed channels through said drop port;

an optical switch coupled to said drop port, said switch selectively supplying said at least one of said first plurality of wavelength division multiplexed channels to one of an opto-electronic receiver and said add port, said at least one of said plurality of wavelength division multiplexed channels being supplied through said output port of said static add/drop multiplexer as one of said second plurality of wavelength division multiplexed channels when said optical switch supplies said at least one of said first plurality of wavelength division multiplexed channels to said add port; and an optical amplifier coupled to said output port for amplifying said second plurality of wavelength division multiplexed channels.

8. An optical device in accordance with claim 6, wherein said optical amplifier comprises an erbium doped fiber.

9. A reconfigurable optical add-drop multiplexer as recited in claim 5 further comprising an optical remodulator coupled to said optical switch and said add port, the optical remodulator comprising:

an optoelectronic element for receiving a dropped channel from said first plurality of wavelength division multiplexed channels and outputting a corresponding electrical signal which includes the information from the dropped channel;

an optical source for emitting an optical signal at an optical channel wavelength; and means for modulating the optical source with information from the electrical signal output by the optoelectronic element to create an output signal including the information from the dropped optical channel;

an output port optically communicating with the add port for supplying the output signal as one of said second plurality of wavelength division multiplexed channels.

10. A reconfigurable optical add-drop multiplexer in accordance with claim 9, wherein a wavelength of said dropped optical channel is different than a wavelength of said output signal.

* * * * *